United States Patent
Legler

(10) Patent No.: US 12,505,026 B2
(45) Date of Patent: Dec. 23, 2025

(54) OBJECT HISTORY TRACKING

(71) Applicant: SAP SE, Walldorf (DE)

(72) Inventor: Thomas Legler, Walldorf (DE)

(73) Assignee: SAP SE, Walldorf (DE)

( * ) Notice: Subject to any disclaimer, the term of this patent is extended or adjusted under 35 U.S.C. 154(b) by 205 days.

(21) Appl. No.: 18/212,322

(22) Filed: Jun. 21, 2023

(65) Prior Publication Data

US 2024/0427690 A1    Dec. 26, 2024

(51) Int. Cl.
*G06F 11/3604* (2025.01)
*G06F 8/71* (2018.01)
*G06F 11/362* (2025.01)

(52) U.S. Cl.
CPC ............ *G06F 11/3612* (2013.01); *G06F 8/71* (2013.01); *G06F 11/3636* (2013.01)

(58) Field of Classification Search
CPC ..... G06F 11/3612; G06F 8/71; G06F 11/3636
See application file for complete search history.

(56) References Cited

U.S. PATENT DOCUMENTS

| | | | | |
|---|---|---|---|---|
| 5,940,616 A * | 8/1999 | Wang | ........................ | G06F 8/24 |
| | | | | 714/E11.212 |
| 2002/0019716 A1* | 2/2002 | Agesen | ............... | G06F 12/0276 |
| | | | | 711/E12.012 |
| 2007/0168949 A1* | 7/2007 | Shattuck | ............... | G06F 9/4492 |
| | | | | 717/115 |
| 2010/0235686 A1* | 9/2010 | Sato | .................... | G06F 11/3636 |
| | | | | 714/45 |
| 2014/0380280 A1* | 12/2014 | Millwood | ............ | G06F 11/366 |
| | | | | 717/127 |
| 2015/0248453 A1* | 9/2015 | Martick | .................. | G06F 16/24 |
| | | | | 702/187 |
| 2022/0019499 A1* | 1/2022 | Choi | .................... | G06F 11/0787 |
| 2023/0094373 A1* | 3/2023 | Muralidharan | ...... | G06N 3/0455 |
| | | | | 714/38.1 |
| 2024/0078227 A1* | 3/2024 | Zhang | .................. | G06F 9/5016 |

* cited by examiner

*Primary Examiner* — Wei Y Zhen
*Assistant Examiner* — Travis Viet Tran
(74) *Attorney, Agent, or Firm* — SCHWEGMAN LUNDBERG & WOESSNER, P.A.

(57) ABSTRACT

Example methods and systems are directed to the enabling of object history tracking in an object-oriented programming environment. According to some examples, a tracking class includes a tracking function and a tracked class includes a tracked function. A system receives user input to link the tracked function to the tracking function. Executable code is executed to create a target object of the tracked class and to execute the tracked function with respect to the target object. Execution of the tracked function triggers the tracking function to obtain tracking data relating to the target object. The tracking data is stored as part of the target object. According to some examples, the system receives an indication of an error that occurred during execution of the executable code, retrieves the tracking data from the target object, and causes presentation of the tracking data at a user device.

20 Claims, 7 Drawing Sheets

OBJECT HISTORY TRACKING

TECHNICAL FIELD

The subject matter disclosed herein generally relates to software debugging. Specifically, but not exclusively, the present disclosure addresses systems and methods for object history tracking to facilitate debugging in an object-oriented programming (OOP) context.

BACKGROUND

When an error occurs during execution of a program, an error message may reveal a final (incorrect) state but lack information about how the state was reached. In an attempt to address this type of issue, many software debugging approaches utilize tracing information. Various types of tracing information can be added to a trace file, e.g., variable values and function calls recorded at different stages of the execution of the program. In some cases, tracing can facilitate the identification of the root cause of unexpected behavior or anomalies in a program.

However, tracing often creates massive amounts of tracing information. Processing and memory resources are required to capture and store the tracing information, affecting system performance and cost, while some tracing information may be largely irrelevant. For example, a significant portion of the tracing information that is output and stored in a trace file may never be required for any troubleshooting. Reviewing such tracing information to identify potential issues can also be time-consuming and resource intensive. Furthermore, in the OOP context, tracing information may fail to adequately reveal the history of a specific object. For example, an object may be found in an unexpected state, but without sufficient data indicating how the object reached the unexpected state.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

DETAILED DESCRIPTION

Figure 1:
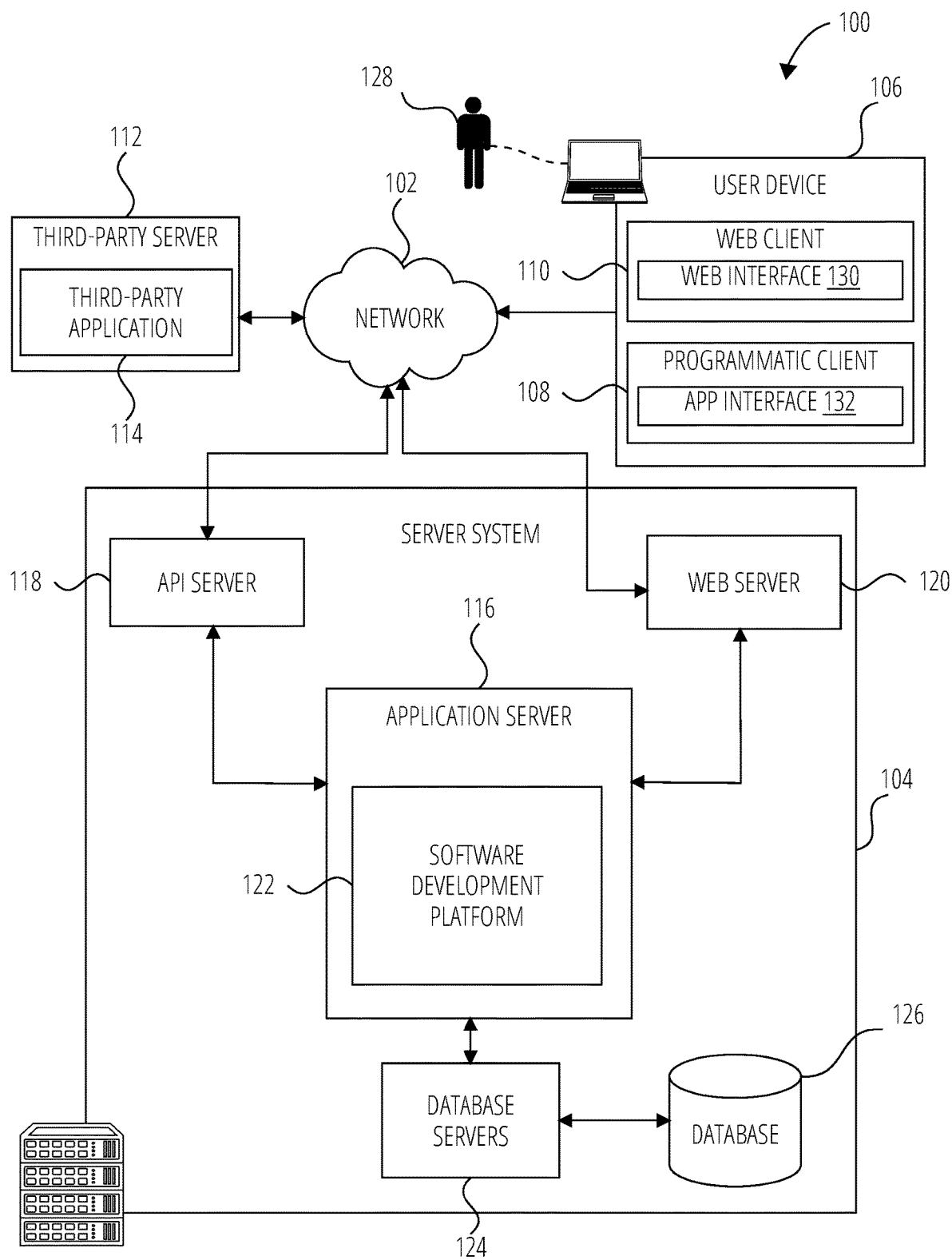
FIG. 1 is a diagrammatic representation of a network environment suitable for creating programs that enable object history tracking in an OOP environment, according to some examples.

Example methods and systems are directed to the enabling of object history tracking in an OOP environment. The terms "tracking function" and "tracking class" are used in this disclosure. As used herein, the term "tracking function" refers to a function (e.g., a method) that, when executed, collects, or retrieves (or causes collection or retrieval of) tracking data, e.g., object state change information or call stack information. As used herein, the term "tracking class" refers to an object class that defines such a tracking function. A tracking class may provide, or form part of, a tracking interface that includes a tracking function and, in some cases, one or more other functions or data members.

The terms "tracked function," "tracked class," and "target object" are also used in this disclosure. As used herein, the term "tracked function" refers to a function (e.g., a method) that is linked to or associated with the tracking function such that execution of the tracked function triggers or results in execution of the tracking function. As used herein, the term "tracked class" refers to an object class that defines or includes such a tracked function, and the term "target object" refers to an instance of the tracked class. The tracked class may inherit the tracking function from the tracking class. Accordingly, in at least some examples, the tracked class is a subclass of the tracking class (superclass).

According to some examples of the present disclosure, a system receives user input to link a tracked function within a tracked class to a tracking function. The tracking function may be configured to record specific events in the history of a target object of the tracked class during execution of a program. The tracking function may be triggered by, or in response to, invocation of the tracked function.

In some examples, executable code is generated and executed to create a target object of the tracked class. The tracked function is executed with respect to the target object, e.g., the tracked function may be a set method that operates to set a value of a variable of the target object. Execution of the tracked function triggers the tracking function to obtain tracking data relating to the target object. The tracking data is stored as part of the target object and may include various types of information useful in tracking a history of the target object over time, e.g., one or more of caller information, state change information, call stacks, events, timestamps, and so forth. The history may include details of changes made to the target object or accessing of the target object during the lifetime of the target object.

For example, where the tracked function is a state-changing function that modifies a variable of the target object, the tracking data may comprise a description of an object state change caused by execution of the tracked function and a timestamp that identifies when the object state change occurred. The tracking data may also include details of a user or component responsible for making or causing the object state change, e.g., based on a call stack. As alluded to above, the tracking data may further include access history data, e.g., to provide details of, or locate, users of broken object states.

The tracked function may be executed multiple times while a program is running, with unique tracking data being obtained and stored for, or in association with, each respective execution. In some examples, a tracked class may have a plurality of tracked functions, e.g., several different methods in or associated with a class may be linked to the tracking function to cause the tracking function to record different types of events associated with the target object. Accordingly, an example technique may include annotating each relevant call (e.g., tracked function, method, or the like) with the tracking function, thereby linking them to the tracking function. In this way, the tracking function may provide useful data indicating how the target object changed or evolved over time, or how other objects, functions, or entities (e.g., users) interacted with the target object at different points in time.

In some examples, the tracking data associated with each event or change, as tracked by the tracking function, is stored in a data member of the target object, e.g., a data member that the tracked class inherits from the tracking class, as defined within the source code. In this way, tracking data for a particular event can be stored as part of the target object and together with other tracking data indicative of historic events associated with the target object.

According to some examples, the system receives an indication of an error that occurred during execution of the executable code, retrieves tracking data from the target object, and causes presentation of the tracking data at a user device (e.g., by printing the target object). This may provide a user with valuable history information about a specific object of interest when a problem is detected. In some examples, the tracking data is automatically retrieved responsive to occurrence of the error. Alternatively or additionally, a user may transmit an object history request via the user device to request the tracking data.

In some examples, tracking data may be filtered, sorted, or transformed before presentation thereof to the user. For example, the system may automatically filter specific types of events, or include only tracking data relating to specific timeframes. This may reduce the information that is output to the user or the tracking data that is ultimately stored, e.g., for further review, which may in turn reduce memory requirements.

As mentioned above, in conventional debugging approaches that involve tracing, large amounts of data may be generated and stored. In examples of the present disclosure, tracking data is only exported or stored in a trace file when specifically required, e.g., when the target object is found in an unexpected state. If not specifically requested, e.g., where the target object is not found in a problematic state and can be seen as having had a "successful" life, the tracking data is not exported outside of the target object and may simply be discarded together with the target object, because the lifespan of the tracking data is bound to the lifespan of the target object. This can be contrasted against conventional tracing in which tracking data may be included in a trace file more indiscriminately. Examples of the present disclosure may thus address or alleviate a technical problem of obtaining adequate object history information without overburdening memory or processing resources of a computing system.

Various degrees or modes of tracking may be employed, e.g., to reduce memory or processing requirements in certain cases, or to customize tracking based on user requirements. For example, the tracking interface or the tracking function may be defined as "No-Op" (No Operation) for purposes of a production version or build, while the tracking interface or the tracking function is enabled only for purposes of a debugging version or build. In some examples, the tracking interface provides tracking functions with user-selectable tracking levels to enable different types or amounts of data to be tracked, depending on the tracking level allocated to a particular tracked function or object.

For example, a user may opt to assign a tracking function with a first tracking level to target objects of a first tracked class, and a tracking function with a second tracking level to target objects of a second tracked class. In the case of the first tracked class, the tracking function may then track and store only the relevant call stack information at that point in time in response to each execution of the tracked function, while in the case of the second tracked class, the tracking function may store the call stack information together with corresponding variable descriptions, state changes, and caller identifiers, providing a more detailed object history for target objects of the second tracked class.

Examples of the present disclosure provide a useful tool that enables users to be more proactive in debugging operations. For example, the tool may enable tracking to be appropriately configured or customized prior to testing or debugging, obviating the need to attempt to achieve a stable reproduction or to implement modified tracing operations after an error has already occurred.

When the effects in this disclosure are considered in aggregate, one or more of the methodologies described herein may obviate a need for certain efforts or resources that otherwise would be involved in tracing, or generally with respect to debugging. Computing resources used by one or more machines, databases, or networks may be more efficiently utilized or even reduced, e.g., as a result of less resources being required to perform tracking or tracing operations during or after program execution, or as a result of less resources being required for storing tracking or tracing information. Examples of such computing resources may include processor cycles, network traffic, memory usage, graphics processing unit (GPU) resources, data storage capacity, power consumption, and cooling capacity.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 128. A web client 110 (e.g., a browser) or a programmatic client 108 (e.g., an "app") may be hosted and executed on the user device 106.

An Application Program Interface (API) server 118 and a web server 120 provide respective programmatic and web interfaces to components of the server system 104. A specific application server 116 hosts a software development platform 122, which includes components, modules, or applications, that help users to build, test, debug, and deploy software-based products, services, or solutions.

The user device 106 can communicate with the application server 116, e.g., via the web interface supported by the web server 120 or via the programmatic interface provided by the API server 118. It will be appreciated that, although only a single user device 106 is shown in FIG. 1, a plurality of user devices may be communicatively coupled to the server system 104 in some examples. Further, while certain functions may be described herein as being performed at either the user device 106 (e.g., web client 110 or programmatic client 108) or the server system 104, the location of certain functionality either within the user device 106 or the server system 104 may be a design choice.

The application server 116 is communicatively coupled to database servers 124, facilitating access to one or more information storage repository, e.g., a database 126. In some examples, the database 126 includes storage devices that store information to be processed or transmitted by the software development platform 122.

The application server 116 accesses application data (e.g., application data stored by the database servers 124) to provide one or more applications or tools to the user device 106 via a web interface 130 or an app interface 132. For example, and as described further below according to examples and with specific reference to FIGS. 2-5, the application server 116, using the software development platform 122, may provide a comprehensive set of software development tools that facilitate a range of functions to build, test, debug, and deploy software-based products, services, or solutions.

To access the tools provided by the software development platform 122, the user 128 may create an account with an entity associated with the server system 104, e.g., a service provider (or access an existing account with the entity). The user 128 may use account credentials to access the web interface 130 (via a suitable web browser) and request access to one or more of the tools. The user 128 may also, in some examples, access the tools using a dedicated programmatic client 108, in which case some functionality may be provided client-side and other functionality may be provided server-side.

In some examples, the application server 116 is part of a cloud-based platform provided by the entity associated with the server system 104 that allows an account holder to utilize the various tools of the software development platform 122. The software development platform 122 may provide user interfaces facilitating communication between the user 128 and the software development platform 122, or between different users of the software development platform 122.

One or more of the application server 116, the database servers 124, the API server 118, the web server 120, and the software development platform 122 may each be implemented in a computer system, in whole or in part, as described below with respect to FIG. 7. In some examples, third-party applications, such as a third-party application 114 executing on a third-party server 112, can communicate with the application server 116 via the programmatic interface provided by the API server 118. For example, a third-party application may support one or more features or functions on a website or platform hosted by a third party or may perform certain methodologies and provide input or output information to the application server 116 for further processing or publication.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
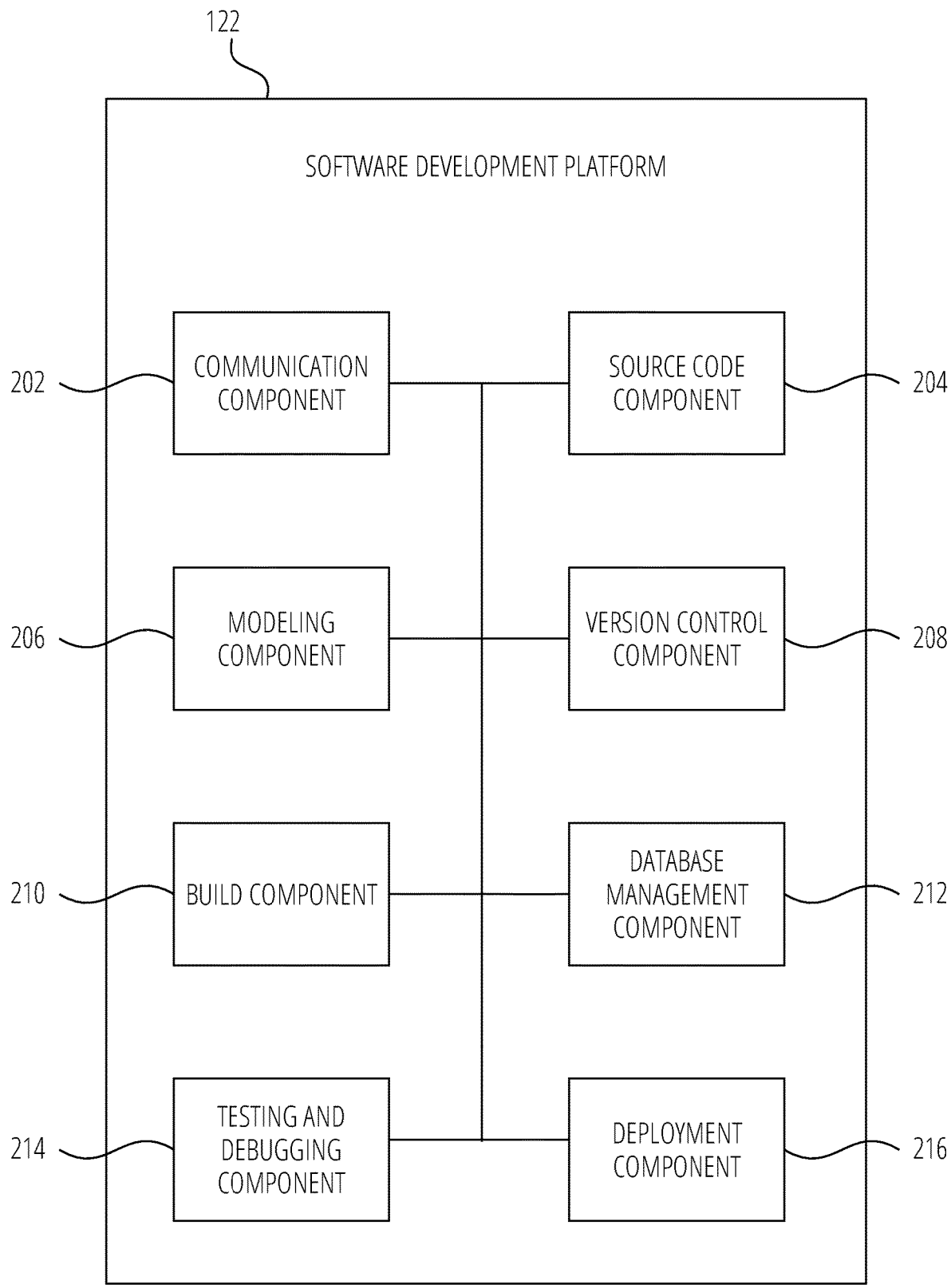
FIG. 2 is a block diagram of certain components of a software development platform, according to some examples.

FIG. 2 is a block diagram illustrating certain components of the software development platform 122, according to some examples. The software development platform 122 is shown as including a communication component 202, a source code component 204, a modeling component 206, a version control component 208, a build component 210, a database management component 212, a testing and debugging component 214, and a deployment component 216.

In some examples, at least some of the components shown in FIG. 2 are configured to communicate with each other to implement aspects described herein. Any one or more of the components described herein may be implemented using hardware (e.g., one or more processors of one or more machines) or a combination of hardware and software. For example, any component described herein may be implemented by a processor configured to perform the operations described herein for that component. Moreover, any two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

The communication component 202 enables the user 128 of the user device 106 of FIG. 1 to transmit data to, and receive data from, the software development platform 122. The communication component 202 may provide user interfaces to enable the user 128 to utilize the various tools of the software development platform 122 and communicate with other users, e.g., the communication component 202 may facilitate the exchange of information among users, such as developers, testers, and project managers, e.g., through chat functionality, file or screen sharing, or project-specific communication channels.

The source code component 204 provides tools for creating, editing, and managing source code files. It supports various programming languages, e.g., OOP languages, such as JAVA or C++. Features of the source code component 204 may include, for example, syntax highlighting, code completion, and static code analysis. The software development platform 122 may provide an integrated development environment (IDE) for writing and editing code.

The modeling component 206 enables the user 128 to build data models. These data models may comprise views that allow developers to define the structure and relationships of or between data without, for example, writing code (or reducing code writing requirements). The modeling component 206 may also provide features to validate and optimize these data models.

The version control component 208 is responsible for tracking and managing changes to the source code. The version control component 208 may enable multiple developers to work on the same code base, and may provide features such as branching, merging, and conflict resolution to maintain the integrity of the code base.

The build component 210 is responsible for compiling source code into executable software. The build component 210 may include a compiler and may be configured to manage dependencies, run scripts, and package the software for distribution.

The database management component 212 may provide tools to manage and monitor one or more databases, e.g., the database 126 or a specific user or client database. This may include, for example, managing authorizations, monitoring system performance, analyzing memory usage, performing database backups and recoveries, and so forth.

The testing and debugging component 214 may be used to test and search for, identify, or resolve issues in the software. The testing and debugging component 214 may offer tools and frameworks for verifying the functionality and performance of the software, supporting different types of testing, such as unit testing, integration testing, or performance testing.

The testing and debugging component 214 may provide features such as breakpoint setting, step-through execution, and variable inspection. In some examples, and as described further with reference to FIGS. 3-5 below, the source code component 204 and the testing and debugging component 214 are configured to enable a user to add or activate a tracking interface to provide object tracking functionality. For example, a tracked class may be annotated such that object history (for one or more target objects of the tracked class) can be tracked during code execution. In some cases, for a particular tracked class, relevant calls (referred to as tracked functions) relating to the tracked class are annotated with a tracking function such that object history tracking is triggered when those calls are made during execution. For example, a set method inside of a tracked class may be annotated with, or linked to, the tracking interface, such that the tracking function is triggered each time the set method is executed with respect to a target object. The tracking interface can also be used to track access history to obtain details of users or components that accessed the target object during execution of a program.

The software development platform 122 may be configured such that the tracking function causes the relevant tracking data to be stored as part of the target object. It will be appreciated that various types of information may be tracked and recorded, depending on the information that is of interest with respect to a particular target object. The tracking data may comprise one or more of: a timestamp, a description of an event associated with execution of the tracked function (e.g., "tracked function A was called by entity B with respect to target object C"), a description of an object state change caused by execution of the tracked function (e.g., "value A of target object B was changed to C at time D"), object creation data (e.g., indicating which user or component created the object, and when), object access history data (e.g., indicating which user or component accessed or used the target object, and when), object copying data (e.g., indicating which user or component copied the object, and when), call stack information, a caller thread, an identifier of an event, or an identifier of the target object. For example, and referring to the set method mentioned above, tracking data indicating that "target object A has changed its internal state from B to C" may be stored, together with a timestamp, thereby providing useful information about how the target object ("object A") evolves as the program executes. As another example, the tracking data may reveal a specific system user (e.g., via a user identifier (ID)) responsible for running a particular query or request associated with the target object.

The deployment component 216 is responsible for managing deployment of software. In some examples, the deployment component 216 automates the process of deploying the software to various environments and can manage versioning of the software. For example, the deployment component 216 may be used to transport design-time artifacts and repository objects from a development environment to a production environment.

Figure 3:
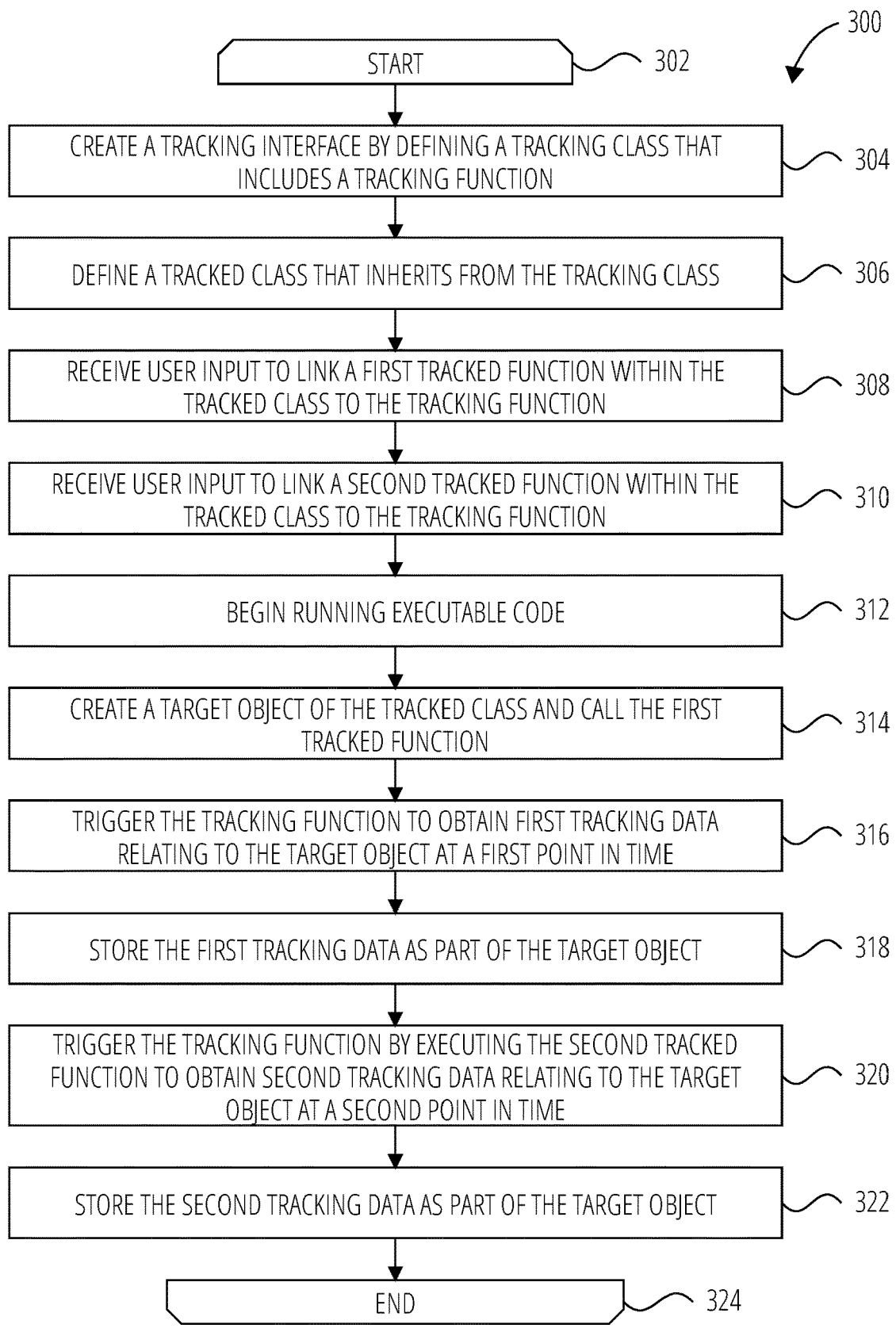
FIG. 3 is a flowchart illustrating operations of a method suitable for providing object history tracking functionality in an OOP environment, according to some examples.

FIG. 3 is a flowchart illustrating operations of a method 300 suitable for providing object history tracking functionality in an OOP environment, according to some examples. By way of example and not limitation, aspects of the method 300 may be performed by the components, devices, systems, or databases shown in FIG. 1 and FIG. 2.

The method 300 commences at opening loop element 302, and proceeds to operation 304, where a tracking interface is created. As mentioned, the user 128 may utilize the user device 106 to access the software development platform 122. The user device 106 can be utilized to compile, edit, or manage a code base. In examples described below, the code base is compiled for debugging purposes. However, it will be appreciated that techniques described herein may also be applied, at least to some extent, in production environments.

The user 128 may wish to track specific events in the lifetime of a target object to facilitate debugging. The user 128 may use the user device 106 to provide suitable user input to define, as part of a code base, a desired tracking interface that is usable to perform object history tracking, e.g., using the source code component 204 or the testing and debugging component 214 of the software development platform 122. The code base can include one or more source code files, source code projects, and the like. Source code files can include files comprising of one or more programming languages, such as C++, JAVA, and the like. Object tracking can be performed on one or more tracked classes or target objects residing or associated with one or more source files. A tracking interface may be defined in various ways, depending, for example, on the programming language, software implementation, or tracking requirements.

The example code below illustrates how a tracking interface can be enabled using suitable macros in the context of C++. The namespace "AttributeEngine" is merely used as a non-limiting example below more clearly to illustrate certain aspects.

```
#ifdef NORELEASE
#define TRACKING_INTERFACE public ::AttributeEngine::Tracker
#define TRACK(...) ::AttributeEngine::Tracker::track(__VA_ARGS__)
#else
#define TRACKING_INTERFACE public ::AttributeEngine::Tracker
#define TRACK(...)
#endif
```

In the above example, the tracking interface is enabled only for nonproductive code (e.g., debugging versions), and not in production builds. In a production build, the relevant macros are defined as "No-Ops." This configuration may facilitate the saving of time or memory resources in a production environment. More specifically, the "NORE-LEASE" macro is used to determine whether the code is being compiled for release or debug. If the code is being compiled for release, then the "TRACK" macro is defined to be empty. If the code is being compiled for debug, then the "TRACK" macro is defined with normal values.

The pseudocode below provides an example of the manner in which a tracking interface in the example form of a tracking class may be defined for implementing a tracking function. In the example below, a tracking class referred to as "Tracker" is shown with two public methods. The first public method is the tracking function ("track"), and the second public method is a method for retrieving collected tracking information ("getTracking"). A private variable, "Tracking," maps event identifiers (IDs) to lists of events, e.g., events in the lifetime of a target object.

```
Class Tracker {
    void track(EventID eventid, TArgs... Fargs) const;
    string getTracking( ) const;
    Private:
    Tracking[id]->Events; // list of events per eventid }
```

While not shown in the example above, different types, or subtypes, of tracking functions may be defined. For example, and as described in more detail, different subtypes can be used to specify different tracking levels.

At operation 306, the method 300 includes defining a tracked class that inherits from the tracking class. The, at operation 308 and operation 310, respectively, the method 300 includes receiving user input to link a first tracked function and a second tracked function within the tracking class to the tracking function. In other words, the tracking function is linked to specific tracked functions, e.g., by annotating each tracked function with the tracking function, to enable object states or other events to be tracked and recorded when those tracked functions are performed during execution. By enhancing or enriching a tracked class in this manner, target objects under investigation become annotated with a framework that allows for easy tracking of actions or events relating to those target objects. However, in contrast with typical tracing, and as will be described further below, the framework obviates the need to export this information unless, or until, the information is explicitly requested.

It will be appreciated that while the tracked functions are defined and linked to the tracking function within the tracked class in some examples described herein, in other examples, it may not be required for a tracked function to be defined or linked inside of a class to track objects of that class, provided the tracked function can, for example, be executed so as to change or affect the state of the relevant target object.

The code below illustrates a simple example of a tracked class that has been "annotated" with the tracking function, with "AttributeDefinition" merely being used as an illustrative example. In this case, the tracked class is annotated with two subtypes of the tracking function, each identifying a different tracking level. A first tracked function and a second tracked function, both in the example form of constructors, are each linked to a tracking function. The first tracked function has assigned to it a first tracking level ("minimal") and the second tracked function has assigned to it a second tracking level ("normal"). The user input provided by the user 128 to the software development platform 122 can thus not only link a tracked function to a tracking function, but can also define not a tracking level, which is used during execution to determine the information to track for a particular event or change.

In the example code below, the tracked class inherits from "CHANGE TRACKER INTERFACE," the first tracked function is linked to "TRACK_CHANGE_MINIMAL," and the second tracked function is linked to "TRACK_CHANGE_NORMAL." In this way, when an "AttributeDefinition" object is created without any arguments, the first constructor is called and the first subtype of the tracking function is executed at the "minimal" tracking level, and when an "AttributeDefinition" object is created with a "TypeDefinition" object as an argument, it will be initialized using the second constructor, with the second subtype of the tracking function being executed at the "normal" tracking level.

```
class AttributeDefinition : public TrexTypes::TypeDefinition,
CHANGE_TRACKER_INTERFACE
{
public:
   AttributeDefinition( )
   {
      TRACK_CHANGE_MINIMAL("constructor", "default");
   }
   AttributeDefinition(const TrexTypes::TypeDefinition& def)
      : TypeDefinition(def)
   {
      TRACK_CHANGE_NORMAL("constructor", "TypeDefinition");
   }
};
```

Once the user 128 has finalized or confirmed the relevant code, including, for example, the tracked class or tracked classes, tracked functions to link to the tracking interface, and the definition of the tracking interface, the source code can be compiled into executable code, e.g., using the build component 210. As mentioned, the software development platform 122 may detect that the source code is to be compiled into a debugging version of the executable code, and, responsive to detecting that the source code is to be compiled into the debugging version, enable the tracking function in the executable code. The method 300 then proceeds to operation 312, where the executable code is loaded into memory and execution begins.

A target object of the tracked class is created, and a first tracked function of the class is called at operation 314. This triggers the tracking function to obtain first tracking data relating to the target object at a first point in time (operation 316). In other words, execution of the first tracked function with respect to the target object results in execution of the tracking function to obtain tracking data relating to the target object. For example, where the tracked function is a state-changing function, the tracking function may be triggered to obtain tracking data that includes a description of an object state change caused by execution of the tracked function and a timestamp that identifies when the object state change occurred.

At operation 318, the first tracking data is stored as part of the target object. In some examples, the tracking function creates (e.g., instantiates) a new "event object" and initializes the event object so as to store required tracking information, e.g., a current program status. The new event object may be created dynamically with its values assigned to a member variable (or variables) associated with the target object, thus causing the tracking information to be stored as part of the target object.

The code below illustrates an example of an event class in the context of C++. As mentioned, the information collected during tracking may depend on a number of factors, including a user-defined tracking level as controlled by a special track call. This may allow a user to distinguish between, for example, more and less important calls, such that different tracking information is collected for different calls made with respect to the target object.

```
class Event
{
   chrono::time_point m_timestamp;
   string m_info;
   string m_callstack;
public:
   void init(bool storeCallstack)
   {
      m_timestamp = chrono::now( );
      if (storeCallstack) {
         m_callstack = getCurrentCallstack( );
      }
   }
   void setInfo(const stringstream& ss);
   const auto& getInfo( ) const;
   const auto& getCallstack( ) const;
   auto getTimeStamp( ) const;
};
```

An event object that is created using the class as shown above collects information for a single tracking event. In this case, the event object collects a timestamp, current call stack information (e.g., current stack trace information), and caller information, which is all stored as part of the target object, e.g., through inheritance of the properties and values of the tracking class by the target object, to enable easy retrieval of this information should it be required.

It will be appreciated that C++ code or pseudocode in a C++ style are provided herein merely as examples. Techniques described herein may be applied using various different OOP languages, formats, or styles.

Still referring to FIG. 3, similarly, at operation 320, a second tracked function may be called, again resulting in triggering of the tracking function. The tracking function may obtain second (different) tracking data relating to the target object at a second point in time. The second tracking data is stored as part of the target object at operation 322. The method ends at closing loop element 324.

Accordingly, in some examples of the present disclosure, a comprehensive history of changes to, or events relating to, a target object becomes part of the target object itself as it evolves over time. Events may include object state changes, access events, or other relevant data. Tracked functions may be executed multiple times, with the tracking data associated with each respective execution of a tracked function being stored as part of the target object. The tracking data may provide insights into how the state, e.g., specific values, of the object changed over time, who called the object, who created the object, who copied the object, and so forth. Further, call stack information may be stored at different time points to facilitate investigations. In some examples, the lifespan of the target object is bound to the lifespan of the tracking information, e.g., the tracking information may simply disappear if it is never required for debugging or other purposes.

Figure 4:
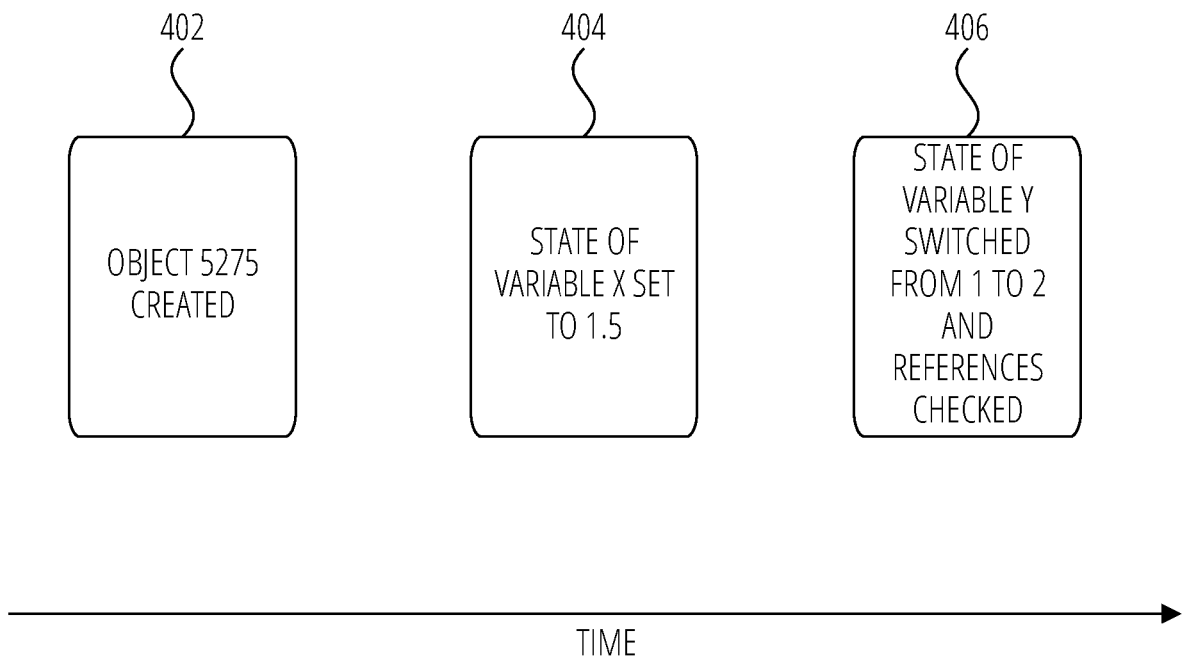
FIG. 4 diagrammatically illustrates a timeline of events in the lifetime of a target object.

FIG. 4 illustrates three example events in the lifetime of a target object. The events can be linked to tracked functions, using the techniques described herein, such that records of the events are stored as part of the tracking information of the target object. In FIG. 4, and merely for example, a first event 402 is the creation of the target object, a second event 404 sets the value of a variable, and a third event 406 switches the value of another value and checks references. These events occur at different points in time, as illustrated by the time arrow in FIG. 4.

Figure 5:
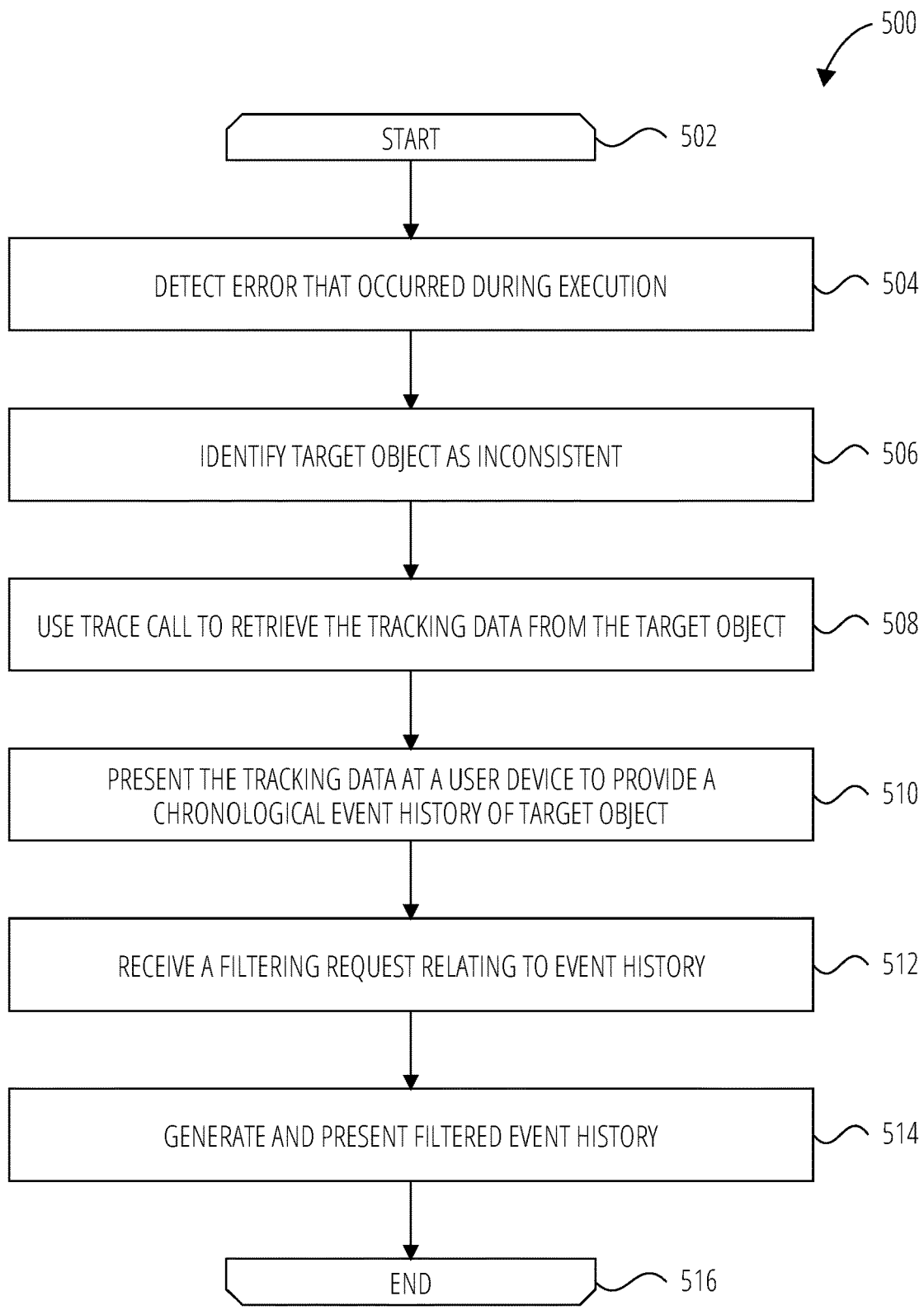
FIG. 5 is a flowchart illustrating operations of a method suitable for retrieval and presentation of tracking data relating to a target object, according to some examples.

FIG. 5 is a flowchart illustrating operations of a method 500 suitable for retrieval and presentation of tracking data relating to a target object, according to some examples. By way of example and not limitation, aspects of the method 500 may be performed by the components, devices, systems, or databases shown in FIG. 1 and FIG. 2. The events shown in FIG. 4 are referenced below to illustrate example tracking data that can be retrieved using the method 500.

The method 500 commences at opening loop element 502 and proceeds to operation 504, where an error occurs during execution, e.g., execution of executable code described with reference to FIG. 3. For example, the error may be that the executable code terminates unexpectedly. The target object may be identified as inconsistent, or a user 128 may suspect that the target object is related to the error, at operation 506.

At operation 508, a suitable tracing call is used to retrieve the tracking data from the target object. For example, the user 128 may configure the testing and debugging component 214 of FIG. 2 such that, if a specified breakpoint or error is reached, the testing and debugging component 214 automatically prints out the tracing information that was stored as part of the target object. As another example, the tracking information can be obtained using a console operation that requests the target object to print its tracking information.

Accordingly, the user 128 may submit, from the user device 106, an object history request, in which case the tracking data is retrieved responsive to receiving the object history request. Alternatively, in some cases, tracking data is retrieved automatically based on fulfillment of a predefined condition.

The tracking data is presented at the user device 106, e.g., via a user interface provided by the communication component 202, to provide a chronological event history of the target object at operation 510. As a simple example, three tracking calls associated with the events of FIG. 4 (first event 402, second event 404, and third event 406) are shown below, together with corresponding tracking data output. Each event has a different timestamp and event descriptions, and includes call information.

```
CALLS:
t.track(true, "Construction", "object", 5275, "created");
t.track(true, "Assigning", "set variable x to", 1.5);
t.track(true, "Changing", "Switch state of variable y to", 2, "and
check references");
  OUTPUTS:
1.
Event Type: Construction
Description: object 5275 created
Time: 2023-5-30 15:53:42.46
Caller: 4[thr=0]: <SYSTEM> at
4: 0x000055cfa8ee8 in Tracker::TestBody( ) -
UnitAttributeDefinition.cpp:241
5: 0x00007f7257893 in <Test Framework>
2.
Event Type: Assigning
Description: set variable x to 1.5
Time: 2023-5-30 15:53:42.53
Caller: 4[thr=0]: <SYSTEM> at
4: 0x000055cfa8ee8 in Tracker::TestBody( ) -
UnitAttributeDefinition.cpp:242
5: 0x00007f7257893 in <Test Framework>
3.
Event Type: Changing
Description: Switch state of variable y to 2 and check references
Time: 2023-5-30 15:53:42.60
Caller: 4[thr=0]: <SYSTEM> at
4: 0x000055cfa8ee8 in Tracker::TestBody( ) -
UnitAttributeDefinition.cpp:243
5: 0x00007f7257893 in <Test Framework>
```

As mentioned above, the type, nature and extent of information that is tracked may be user-defined, at least to some extent. For example, in addition to the above, a user may also wish to track a server name associated with the event, in order to collect that information as part of the tracking data. Further, the history of the object need not necessarily include all events, or chronological output, as the user 128 may wish to filter the output. The method 500 includes receiving a filtering request relating to the event history at operation 512. For example, the user 128 may use the user device 106 to select filtering of the output such that only events relating to "variable x" are included in the output. The software development platform 122 then generates and presents a filtered event history at the user device 106, at operation 514. The method ends at closing loop element 516.

Accordingly, in examples of the disclosure, useful tracing or debugging information may be obtained by tracking events or changes associated with a target object. In this way, once an error state is reached, it is not only the final state, or certain limited state information, of the target object that is available, but a full history (depending on settings) of the evolution of the target object.

As mentioned above, the tracking data may include object copying data. In some examples, a tracked object may be copied (e.g., by way of object assignment, or copied over a network using techniques such as serialization and deserialization). The tracking data stored as part of the "original" tracked object may then be copied or otherwise passed on to the "new" object. In some examples, the software development platform 122 may automatically add additional tracking information to the new object, to the original tracked object, or to both. The additional tracking information may, for example, include details of the copying operation, such as the user or component responsible for copying the original tracked object. This may facilitate object history tracking across various related objects, e.g., for debugging purposes.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: receiving user input to link, in source code, a tracking function of a tracking class to a tracked function within a tracked class; executing, based on the source code, executable code to: create a target object of the tracked class; execute the tracked function with respect to the target object, execution of the tracked function triggering the tracking function to obtain tracking data relating to the target object, and store the tracking data as part of the target object; receiving an indication of an error that occurred during execution of the executable code; responsive to receiving the indication of the error, retrieving the tracking data from the target object; and causing presentation of the tracking data at a user device.

In Example 2, the subject matter of Example 1 includes, the operations further comprising: receiving user input to define, in the source code, the tracked class to inherit from the tracking class.

In Example 3, the subject matter of Examples 1-2 includes, wherein the tracking data is stored in at least one data member of the target object together with other tracking data indicative of historic events associated with the target object, at least some of the historic events comprising object state changes.

In Example 4, the subject matter of Examples 1-3 includes, wherein the tracked function is a state-changing function, and wherein the tracking data comprises a description of an object state change caused by execution of the tracked function and a timestamp that identifies when the object state change occurred.

In Example 5, the subject matter of Examples 1-4 includes, wherein executing the executable code comprises executing the tracked function multiple times with respect to the target object, the tracking data associated with each respective execution of the tracked function being stored as part of the target object.

In Example 6, the subject matter of Examples 1-5 includes, wherein linking of the tracking function to the tracked function comprises annotating the tracked function with the tracking function such that execution of the tracked function with respect to the target object also results in execution of the tracking function.

In Example 7, the subject matter of Examples 1-6 includes, wherein the tracked function is a first tracked function, and wherein the tracking data is first tracking data, the operations further comprising: receiving user input to link, in the source code, the tracking function to a second tracked function within the tracked class; executing the second tracked function with respect to the target object, execution of the second tracked function triggering the tracking function to obtain second tracking data relating to the target object; and storing the second tracking data as part of the target object, wherein retrieving the first tracking data comprises retrieving both the first tracking data and the second tracking data from the target object.

In Example 8, the subject matter of Examples 1-7 includes, wherein the tracking data comprises at least one of: a timestamp; a description of an event associated with execution of the tracked function; a description of an object state change caused by execution of the tracked function; object creation data; object copying data; object access history data; call stack data; a caller thread; an identifier of an event; or an identifier of the target object.

In Example 9, the subject matter of Examples 1-8 includes, wherein triggering of the tracking function causes creation of a new event object that is used to retrieve the tracking data relating to the target object.

In Example 10, the subject matter of Examples 1-9 includes, wherein storing the tracking data as part of the target object comprises storing the tracking data such that a lifespan of the tracking data is bound to a lifespan of the target object.

In Example 11, the subject matter of Examples 1-10 includes, wherein the user input to link the tracking function to the tracked function identifies a tracking level, and wherein the tracking function obtains the tracking data relating to the target object based on the tracking level.

In Example 12, the subject matter of Examples 1-11 includes, the operations further comprising: receiving, from the user device, an object history request, wherein the tracking data is retrieved responsive to receiving the indication of the error and the object history request.

In Example 13, the subject matter of Examples 1-12 includes, the operations further comprising: detecting that the source code is to be compiled into a debugging version of the executable code; and responsive to detecting that the source code is to be compiled into the debugging version of the executable code, enabling the tracking function in the executable code.

In Example 14, the subject matter of Examples 1-13 includes, wherein the indication of the error comprises an indication that the executable code terminates unexpectedly.

Example 15 is a method comprising: receiving user input to link, in source code, a tracking function of a tracking class to a tracked function within a tracked class; executing, based on the source code, executable code to: create a target object of the tracked class; execute the tracked function with respect to the target object, execution of the tracked function triggering the tracking function to obtain tracking data relating to the target object, and store the tracking data as part of the target object; receiving an indication of an error that occurred during execution of the executable code; responsive to receiving the indication of the error, retrieving the tracking data from the target object; and causing presentation of the tracking data at a user device.

In Example 16, the subject matter of Example 15 includes, wherein the tracking data is stored in at least one data member of the target object together with other tracking data indicative of historic events associated with the target object, at least some of the historic events comprising object state changes.

In Example 17, the subject matter of Examples 15-16 includes, wherein the tracked function is a state-changing function, and wherein the tracking data comprises a description of an object state change caused by execution of the tracked function and a timestamp that identifies when the object state change occurred.

Example 18 is a non-transitory computer-readable medium that stores instructions that, when executed by one or more processors, cause the one or more processors to perform operations comprising: receiving user input to link, in source code, a tracking function of a tracking class to a tracked function within a tracked class; executing, based on the source code, executable code to: create a target object of the tracked class; execute the tracked function with respect to the target object, execution of the tracked function triggering the tracking function to obtain tracking data relating to the target object, and store the tracking data as part of the target object; receiving an indication of an error that occurred during execution of the executable code; responsive to receiving the indication of the error, retrieving the tracking data from the target object; and causing presentation of the tracking data at a user device.

In Example 19, the subject matter of Example 18 includes, wherein the tracking data is stored in at least one data member of the target object together with other tracking data indicative of historic events associated with the target object, at least some of the historic events comprising object state changes.

In Example 20, the subject matter of Examples 18-19 includes, wherein the tracked function is a state-changing function, and wherein the tracking data comprises a description of an object state change caused by execution of the tracked function and a timestamp that identifies when the object state change occurred.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 6:
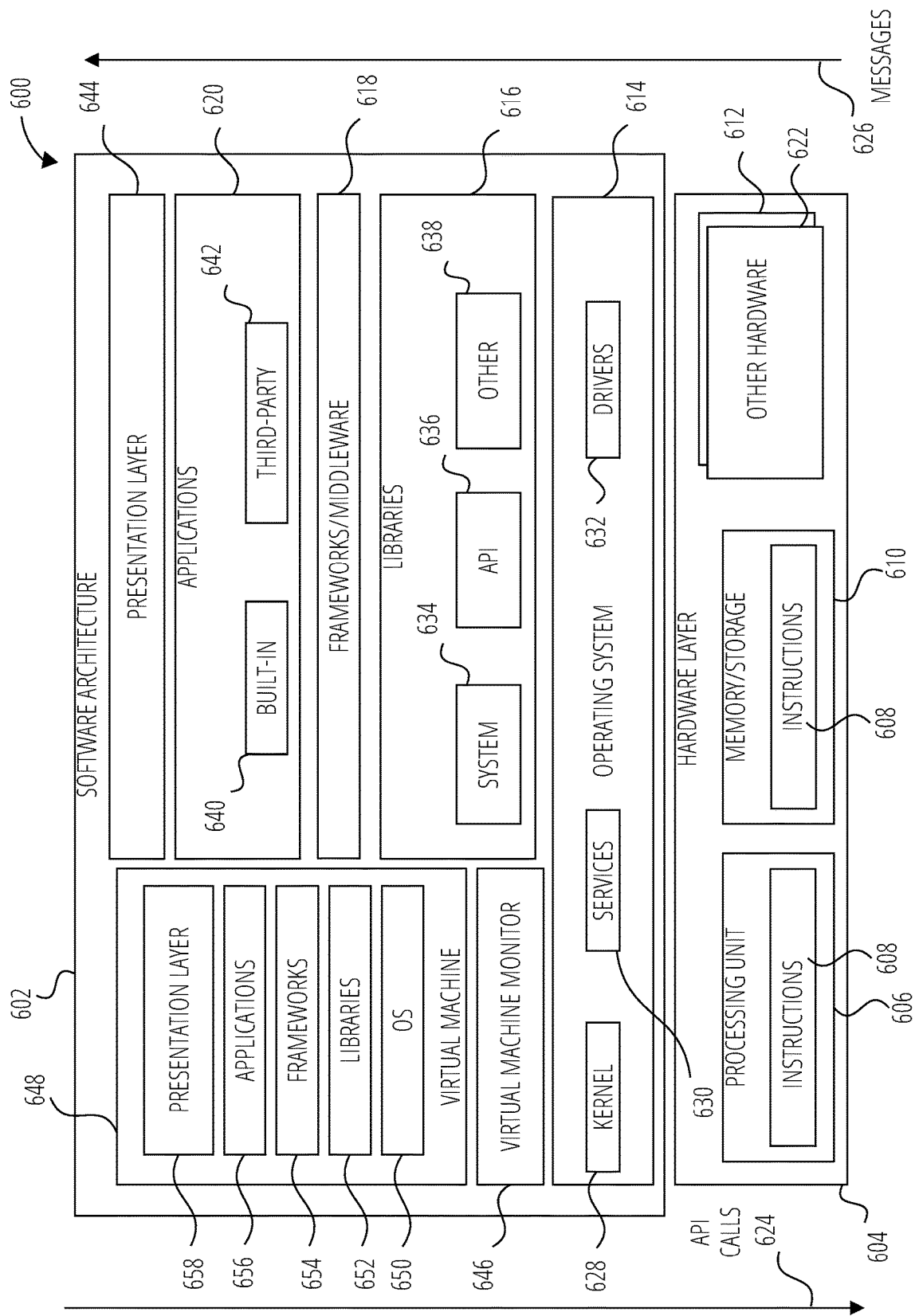
FIG. 6 is a block diagram showing a software architecture for a computing device, according to some examples.

FIG. 6 is a block diagram 600 showing a software architecture 602 for a computing device, according to some examples. The software architecture 602 may be used in conjunction with various hardware architectures, for example, as described herein. FIG. 6 is merely a non-limiting illustration of a software architecture, and many other architectures may be implemented to facilitate the functionality described herein. A representative hardware layer 604 is illustrated and can represent, for example, any of the above referenced computing devices. In some examples, the hardware layer 604 may be implemented according to the architecture of the computer system of FIG. 7.

The representative hardware layer 604 comprises one or more processing units 606 having associated executable instructions 608. Executable instructions 608 represent the executable instructions of the software architecture 602, including implementation of the methods, modules, subsystems, and components, and so forth described herein and may also include memory and/or storage modules 610, which also have executable instructions 608. Hardware layer 604 may also comprise other hardware as indicated by other hardware 612 and other hardware 622 which represent any other hardware of the hardware layer 604, such as the other hardware illustrated as part of the software architecture 602.

In the architecture of FIG. 6, the software architecture 602 may be conceptualized as a stack of layers where each layer provides particular functionality. For example, the software architecture 602 may include layers such as an operating system 614, libraries 616, frameworks/middleware layer 618, applications 620, and presentation layer 644. Operationally, the applications 620 or other components within the layers may invoke API calls 624 through the software stack and access a response, returned values, and so forth illustrated as messages 626 in response to the API calls 624. The layers illustrated are representative in nature and not all software architectures have all layers. For example, some mobile or special purpose operating systems may not provide a frameworks/middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of an interrupt and, in response, cause the software architecture 602 to pause its current processing and execute an interrupt service routine (ISR) when an interrupt is accessed.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 616 may provide a common infrastructure that may be utilized by the applications 620 or other components or layers. The libraries 616 typically provide functionality that allows other software modules to perform tasks in an easier fashion than to interface directly with the underlying operating system 614 functionality (e.g., kernel 628, services 630 or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks/middleware layer 618 may provide a higher-level common infrastructure that may be utilized by the applications 620 or other software components/modules. For example, the frameworks/middleware layer 618 may provide various graphic user interface (GUI) functions, high-level resource management, high-level location services, and so forth. The frameworks/middleware layer 618 may provide a broad spectrum of other APIs that may be utilized by the applications 620 or other software components/modules, some of which may be specific to a particular operating system or platform.

The applications 620 include built-in applications 640 or third-party applications 642. Examples of representative built-in applications 640 may include, but are not limited to, a contacts application, a browser application, a book reader application, a location application, a media application, a messaging application, or a game application. Third-party applications 642 may include any of the built-in applications as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 642 may invoke the API calls 624 provided by the mobile operating system such as operating system 614 to facilitate functionality described herein.

The applications 620 may utilize built in operating system functions (e.g., kernel 628, services 630 or drivers 632), libraries (e.g., system libraries 634, API libraries 636, and other libraries 638), and frameworks/middleware layer 618 to create user interfaces to interact with users of the system. Alternatively, or additionally, in some systems, interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware computing device. A virtual machine is hosted by a host operating system (operating system 614) and typically, although not always, has a virtual machine monitor 646, which manages the operation of the virtual machine as well as the interface with the host operating system (e.g., operating system 614). A software architecture executes within the virtual machine 648 such as an operating system 650, libraries 652, frameworks/middleware 654, applications 656 or presentation layer 658. These layers of software architecture executing within the virtual machine 648 can be the same as corresponding layers previously described or may be different.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module that operates to perform certain operations as described herein.

In various examples, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules are temporarily configured (e.g., programmed), each of the hardware-implemented modules need not be configured or instantiated at any one instance in time. For example, where the hardware-implemented modules comprise, a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (SaaS)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various examples.

Figure 7:
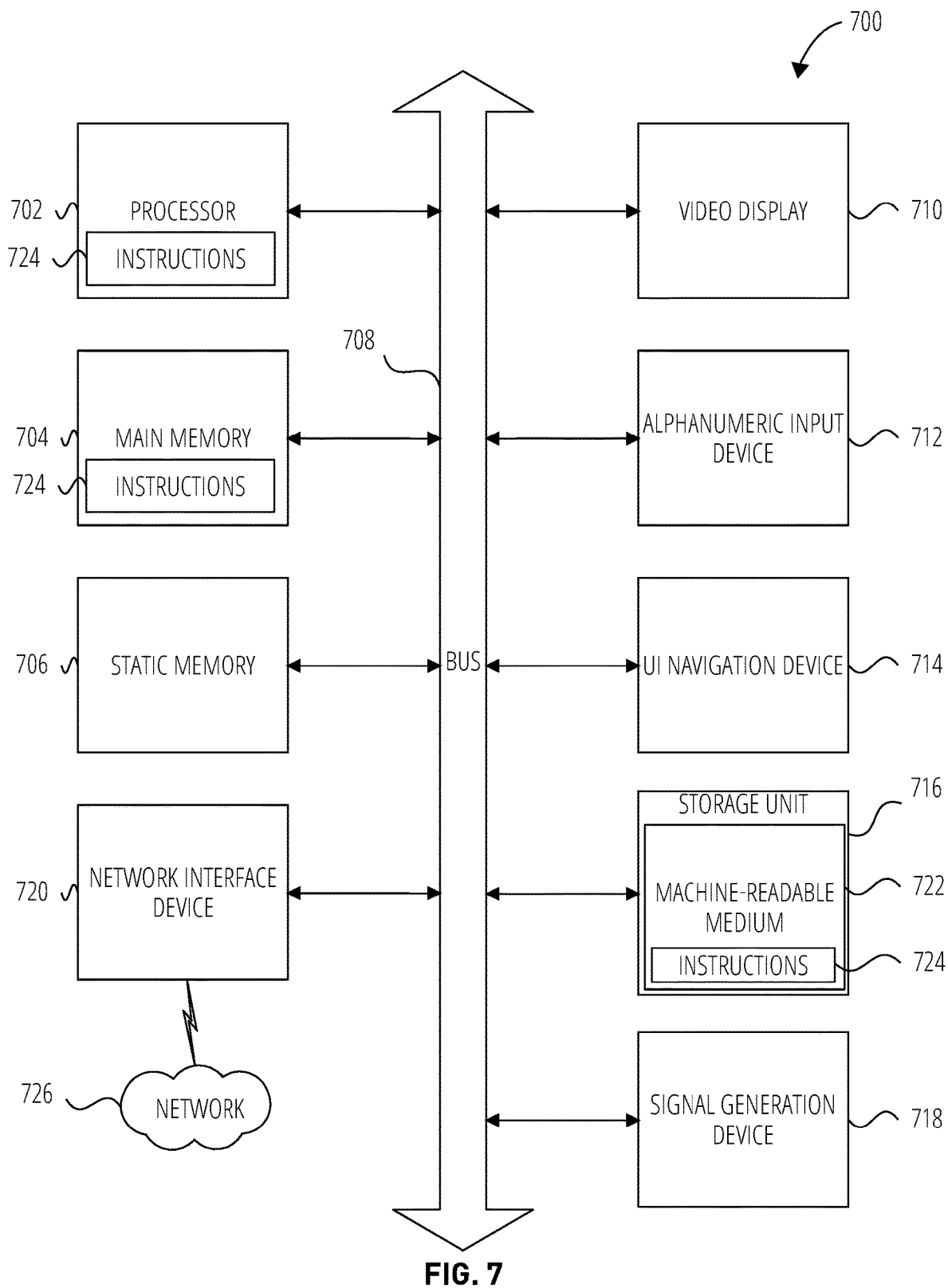
FIG. 7 is a block diagram of a machine in the form of a computer system, according to some examples, within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a GPU, or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alpha-numeric input device 712 (e.g., a keyboard or a touch-sensitive display screen), a UI navigation (or cursor control) device 714 (e.g., a mouse), a storage unit 716, a signal generation device 718 (e.g., a speaker), and a network interface device 720.

The storage unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 or within the processor 702 during execution thereof by the computer system 700, with the main memory 704 and the processor 702 also each constituting a machine-readable medium 722.

While the machine-readable medium 722 is shown in accordance with some examples to be a single medium, the term "machine-readable medium" may include a single medium or multiple media (e.g., a centralized or distributed database, or associated caches and servers) that store the one or more instructions 724 or data structures. The term "machine-readable medium" shall also be taken to include any tangible medium that is capable of storing, encoding, or carrying instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of a machine-readable medium 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 724 may further be transmitted or received over a communications network 726 using a transmission medium. The instructions 724 may be transmitted using the network interface device 720 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 724 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

What is claimed is:

1. A system comprising:
   at least one memory that stores instructions; and
   one or more processors, configured by the instructions, to perform operations comprising:
   receiving user input to define, in source code, a tracked class to inherit from a tracking class;
   linking, in the source code, a tracking function of the tracking class to a tracked function within the tracked class;
   executing, based on the source code, executable code to:
      create a target object of the tracked class, wherein the tracked class comprises one or more data members inherited from the tracking class;
      execute the tracked function with respect to the target object, which triggers the tracking function to record different types of events associated with the target object to obtain tracking data; and
      store the tracking data in the one or more data members of the target object only during a lifespan of the target object;
   receiving an indication of an error that occurred during execution of the executable code;
   in response to receiving the indication of the error, retrieving the tracking data from the target object; and
   presenting the tracking data at a user device.

2. The system of claim 1, wherein the tracking data comprises historic events associated with the target object, at least some of the historic events comprising object state changes.

3. The system of claim 1, wherein the tracked function is a state-changing function, the tracking data comprises a description of an object state change caused by execution of the tracked function, and the tracking data comprises a timestamp that identifies when the object state change occurred.

4. The system of claim 1, wherein executing the executable code comprises executing the tracked function multiple times with respect to the target object, the tracking data associated with each respective execution of the tracked function being stored in the target object.

5. The system of claim 1, wherein linking of the tracking function to the tracked function comprises annotating the tracked function with the tracking function such that execution of the tracked function with respect to the target object also results in execution of the tracking function.

6. The system of claim 1, wherein the tracked function is a first tracked function, and wherein the tracking data is first tracking data, the operations further comprising:
  linking, in the source code, the tracking function to a second tracked function within the tracked class; and
  executing the second tracked function with respect to the target object, execution of the second tracked function triggering the tracking function to obtain second tracking data relating to the target object;
  wherein retrieving the first tracking data comprises retrieving both the first tracking data and the second tracking data from the target object.

7. The system of claim 1, wherein the tracking data comprises at least one of: a timestamp; a description of an event associated with execution of the tracked function; a description of an object state change caused by execution of the tracked function; object creation data; object copying data; object access history data; call stack data; a caller thread; an identifier of an event; or an identifier of the target object.

8. The system of claim 1, wherein triggering of the tracking function causes creation of a new event object that is used to retrieve the tracking data relating to the target object.

9. The system of claim 1, wherein the operations further comprise identifying a tracking level, and the tracking function obtains the tracking data relating to the target object based on the tracking level.

10. The system of claim 1, the operations further comprising:
  receiving, from the user device, an object history request, wherein the tracking data is retrieved in response to receiving the indication of the error and the object history request.

11. The system of claim 1, the operations further comprising:
  detecting that the source code is to be compiled into a debugging version of the executable code; and
  in response to detecting that the source code is to be compiled into the debugging version of the executable code, enabling the tracking function in the executable code.

12. The system of claim 1, wherein the indication of the error comprises an indication that the executable code terminates unexpectedly.

13. A method comprising:
  receiving user input to define, in source code, a tracked class to inherit from a tracking class;
  linking, in the source code, a tracking function of the tracking class to a tracked function within the tracked class;
  executing, based on the source code, executable code to:
    create a target object of the tracked class, wherein the tracked class comprises one or more data members inherited from the tracking class;
    execute the tracked function with respect to the target object, which triggers the tracking function to record different types of events associated with the target object to obtain tracking data; and
    store the tracking data in the one or more data members of the target object only during a lifespan of the target object;
  receiving an indication of an error that occurred during execution of the executable code;
  in response to receiving the indication of the error, retrieving the tracking data from the target object; and
  presenting the tracking data at a user device.

14. The method of claim 13, wherein the tracking data comprises historic events associated with the target object, at least some of the historic events comprising object state changes.

15. The method of claim 13, wherein the tracked function is a state-changing function, the tracking data comprises a description of an object state change caused by execution of the tracked function, and the tracking data comprises a timestamp that identifies when the object state change occurred.

16. The method of claim 13, wherein the method comprises identifying a tracking level, and the tracking function obtains the tracking data relating to the target object based on the tracking level.

17. A non-transitory computer-readable medium that stores instructions that, when executed by one or more processors, cause the one or more processors to perform operations comprising:
  receiving user input to define, in source code, a tracked class to inherit from a tracking class;
  linking, in the source code, a tracking function of the tracking class to a tracked function within the tracked class;
  executing, based on the source code, executable code to:
    create a target object of the tracked class, wherein the tracked class comprises one or more data members inherited from the tracking class;
    execute the tracked function with respect to the target object, which triggers the tracking function to record different types of events associated with the target object to obtain tracking data; and
    store the tracking data in the one or more data members of the target object only during a lifespan of the target object;
  receiving an indication of an error that occurred during execution of the executable code;
  in response to receiving the indication of the error, retrieving the tracking data from the target object; and
  presenting the tracking data at a user device.

18. The non-transitory computer-readable medium of claim 17, wherein the tracking data comprises historic events associated with the target object, at least some of the historic events comprising object state changes.

19. The non-transitory computer-readable medium of claim 17, wherein the tracked function is a state-changing function, the tracking data comprises a description of an object state change caused by execution of the tracked function, and the tracking data comprises a timestamp that identifies when the object state change occurred.

20. The non-transitory computer-readable medium of claim 17, the operations further comprising identifying a tracking level, wherein the tracking function obtains the tracking data relating to the target object based on the tracking level.

* * * * *